C. F. Werner,
Making Wood Gas.
No 17,465.    Patented June 2, 1857.
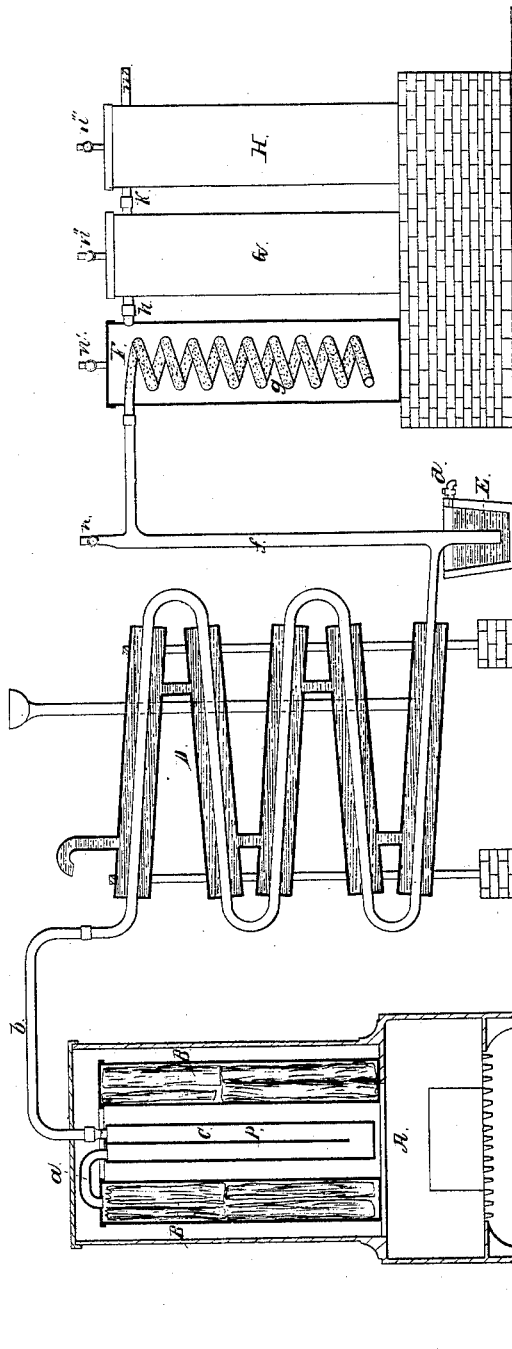
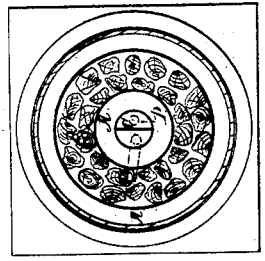

UNITED STATES PATENT OFFICE.

CHARLES FREDR. WERNER, OF NEW YORK, N. Y.

IMPROVEMENT IN WOOD-GAS GENERATORS.

Specification forming part of Letters Patent No. 17,465, dated June 2, 1857.

*To all whom it may concern:*

Be it known that I, CHARLES FREDR. WERNER, of the city of New York, in the county and State of New York, have invented a new and Improved Apparatus for Making Illuminating-Gas from Wood; and I do hereby declare that the following is a full and exact description thereof, reference being had to the accompanying drawing, and to the letters of reference marked thereon.

A is an oven, into which an upright boiler or retort B is placed, containing the wood from which the illuminating-gas is to be produced. This boiler is so constructed that the flame from the fire in the oven A not only encircles said boiler or retort on the outside, but passes likewise through the center of the same, whereby the wood contained within said retort is not only acted upon from one side, but from both sides at the same time. The gas produced in this boiler B passes through the pipe $a$ into a cylinder C, situated in the opening in the center of the retort or boiler B, and is likewise exposed to the heat of the fire. This cylinder C is, some distance from the top downward, divided by a partition-plate $p$ into two parts, whereby the gas, entering on one side, is obliged to pass down this cylinder on one side of the partition $p$, and then up again on the other side, being therefore all that time subjected to the heat of the fire, and passes then through the pipe $b$ to the cooler D. Instead of this cylinder, pipes may be used passing downward and then up again; but this plan is objectionable on account of the difficulty of cleaning the same. All particles or gases capable of being condensed are condensed by this cooler D and separated from the gas, and are collected in a tub or vessel E at the bottom of the pipe $f$. This pipe $f$ projects some distance into the vessel E, which latter is, in the beginning of the operation, filled with water, so as to form a hydraulic joint to prevent the escape of the gas at this end of the pipe. The condensed parts of the gas, which have by their condensation been converted into fluids, flow during the operation into said vessel E and are allowed to run out of said vessel through the cock $d$, so as to keep the hydraulic joint always at the same height. The gas, separated from most particles capable of being condensed by water, passes then up the pipe $f$ into the purifying apparatus F through a coil of pipes $g$, situated in said purifier F, and escapes therefrom in minute streams through small holes in the pipe $g$ into the compartment of the purifier, where it percolates through hydrate of lime, with which said purifier is filled, and escapes at the top through the pipe $h$ into a second purifier G, and after being purified in this second apparatus in a similar manner passes through the pipe $k$ into the third purifier H, from which, after having in a similar manner been purified for a third time, it escapes by a pipe $m$ to the gasometer.

The pipe $f$, as well as the purifiers F, G, and H, are provided at the top with air-cocks $n, n', n''$, and $n'''$, to allow the atmospheric air to escape out of the different pipes and vessels at the commencement of the operation, and to serve at the same time to test the quality of the gas during the progress of purifying.

In the decomposition of wood by heat—that is, by dry distillation in a close boiler or retort—we obtain charcoal as a residue, and oils, tar, and different gases, which pass off mixed together. Some of the gases change and are converted by condensation into fluids, and from which we obtain methyloxide hydrate, or commonly called "wood vinegar," while the oils and tar can by a further exposure to heat be in a great measure converted into gases, which will considerably improve the illuminating-power of the gas. From one hundred parts of wood, by weight, we obtain twenty-five per cent. of charcoal, twenty-five per cent. uncondensable or illuminating gas, ten per cent. of oils and tar, and forty per cent. of methyloxide hydrate or wood vinegar; or, from one cord of pine wood we obtain forty to fifty bushels of charcoal, from fifteen thousand to sixteen thousand cubic feet of illuminating-gas, two hundred pounds of tar, and one hundred gallons of wood vinegar.

In almost all former arrangements the decomposition of wood for the production of illuminating-gas has been carried on in boilers or retorts which were only surrounded by fire, in consequence of which the wood laying on the outside was already converted into charcoal before the inner layer has been effected by the heat, whereby the gas produced from this inner layer of wood mixed with the carbonic acid, while passing through and over the already-made charcoal, losing thereby considerable of its illuminating-power, besides diminishing the charcoal in value. This difficulty is altogether prevented by my improved boiler.

As above mentioned, in the decomposition of wood not only is illuminating-gas, in connection with other condensable gases, obtained, but likewise oils and tar, which consist, principally, of pyrcalin, paraffine, and creosote, and which produce by a further exposure to heat gases which, if mixed with the illuminating-gas produced directly from the wood, not only improves the same in its illuminating-power, but increases the volume of the gas considerably. To decompose these oils and tar is the object of the cylinder C, in which, as above described, the gas, together with all other productions obtained from the wood, is made to pass down on one side and up again on the other side, being all the time exposed to the effect of heat, by which the oils and tar are mostly converted into gas, and which, mixed with the other gas, greatly improves the volume as well as the illuminating-power of the same.

The boiler or retort B and the cylinder C are so arranged that the same can easily be taken out of the oven A when the operation is completed and replaced by a new one already filled with wood, for the purpose of saving time and likewise to allow the charcoal to cool off before the same is taken out of the boiler, whereby the quality and quantity are considerably improved, instead of withdrawing the same from the heated boiler or retort directly after the completion of the operation, as is the case when the retort is stationary. In the practicable execution the pipe $f$, leading from the cooler to the purifiers, will be so arranged as to be able to conduct the gas into either of the purifiers, so that, as in the first purifier, all or nearly all the bituminous matter which escapes condensation in the cooler will be collected, and the lime in the same will become impure before that in the others, and will require to be thrown away after every charge.

To economize the use of lime, I attach, then, the pipe $f$ with the second purifier and replace a fresh purifier filled with new lime in the place of the first one, which will then become the last one, through which the gas passes before escaping into the gasometer.

What I claim as my invention, and desire to secure by Letters Patent, is—

The arrangement of a movable boiler or retort B and cylinder C, being combined in the manner and for the purpose as described.

CHARLES FREDR. WERNER.

Witnesses:
  HENRY E. ROEDER,
  F. TOKENHAUSEN.